United States Patent [19]

Suciu et al.

[11] Patent Number: 5,000,859

[45] Date of Patent: Mar. 19, 1991

[54] PROCESS FOR SODIUM SULFIDE/FERROUS SULFATE TREATMENT OF HEXAVALENT CHROMIUM AND OTHER HEAVY METALS

[75] Inventors: Dan F. Suciu; Penny M. Wikoff; John M. Beller, all of Idaho Falls, Id.; Charles J. Carpenter, Lynn Haven, Fla.

[73] Assignee: The United States of America as represented by the Secretary of the Air Force, Washington, D.C.

[21] Appl. No.: 263,161

[22] Filed: Oct. 26, 1988

[51] Int. Cl.$^5$ .............................. C02F 1/52; C02F 1/70
[52] U.S. Cl. .................................... 210/713; 210/715; 210/720; 210/724; 210/726; 210/748; 210/913; 423/55
[58] Field of Search ............... 210/702, 713, 715, 720, 210/724–728, 913, 748; 423/55, 57, 58

[56] References Cited

U.S. PATENT DOCUMENTS

| | | | |
|---|---|---|---|
| 1,932,531 | 10/1933 | Parker | 23/285 |
| 2,110,187 | 3/1938 | Williams | 23/56 |
| 2,346,320 | 4/1944 | Moran et al. | 210/717 |
| 2,977,202 | 3/1961 | Bueltman et al. | 23/285 |
| 3,023,089 | 2/1962 | Graves et al. | 23/259.2 |
| 3,027,321 | 3/1962 | Selm et al. | 210/59 |
| 3,218,252 | 11/1965 | Glover et al. | 210/4 |
| 3,294,680 | 12/1966 | Lancy | 210/49 |
| 3,575,853 | 4/1971 | Gaughan et al. | 210/713 |
| 3,740,331 | 6/1973 | Anderson et al. | 210/53 |
| 4,102,784 | 7/1978 | Schlauch | 210/47 |
| 4,362,629 | 12/1982 | Senda et al. | 210/748 |
| 4,705,639 | 11/1987 | Aldrich | 210/720 |

FOREIGN PATENT DOCUMENTS

49-16714 2/1974 Japan ................................ 210/913

OTHER PUBLICATIONS

"Rate Studies on the Primary Step of the Reduction of Chromium (VI) by Iron (II)", James H. Espenson, J Am Chem Soc 92:7 (Apr. 8, 1970).
"Sulfide Process Removes Metals, Produces Disposable Sludge", M. C. Scott, Industrial Wastes (Jul./Aug. 1979).
"Potential Transformations of Chrominum in Natural Waters", David C. Schroeder and G. Fred Lee, Water, Air, and Soil Pollution 4:3/4 (Jul./Aug. 1975).
"Treatment of Metal Finishing Wastes by Sulfide Precipitation", Richard M. Schlauch and Arthur C. Epstein, Rept No EPA600/2-77-049 (Feb. 1977).
"Sulfide vs Hydroxide Precipitation of Heavy Metals From Industrial Wastewater", A. K. Robinson, 1st Annual Conference on Advanced Pollution Control for the Metal Finishing Industry, Jan. 1978, Rept No EPA-600/8-78-010, pp. 59-65 (May 1978).
"An EPA Demonstration Plant for Heavy Metals Removal by Sulfide Precipitation", Murray C. Scott, Second Conference on Advanced Pollution Control for the Metal Finishing Industry, Rept No EPA-600/8-79-014, pp. 106-113 (Jun. 1979).
"Summary Report-Control and Treatment Technology for the Metal Finishing Industry-Sulfide Precipitation", Rept No. EPA-625/8-80 -003 (Apr. 1980).

(List continued on next page.)

Primary Examiner—Peter Hruskoci
Attorney, Agent, or Firm—Bobby D. Scearce; Donald J. Singer

[57] ABSTRACT

A process for treating industrial waste water containing hexavalent chromium ($Cr^{+6}$) and other heavy metals is disclosed which comprises reduction of $Cr^{+6}$ to trivalent chromium ($Cr^{+3}$) and the precipitation thereof with other heavy metals by addition of sulfide ion and ferrous ion to the waste stream at a pH of about 7 to 9 under conditions such that sludge production by the process of the invention is substantially less than that characteristic of prior art processes. Polymers are added to the solution to assist flocculation and clarification of the waste stream. More specifically, the invention comprises adding sulfide ion in a sulfide to hexavalent chromium ratio of about 0.7-2.5:1 and adding ferrous ion in a ferrous to hexavalent chromium ratio of about 0.5-5.0:1. The waste stream pH is preferably maintained in the range of about 7.2 to 7.5.

9 Claims, 7 Drawing Sheets

OTHER PUBLICATIONS

"*Treatment of Plating Wastewaters by Ferrous Reduction, Sulfide Precipitation, Coagulation and Upflow Filtration*", Thomas E. Higgins, Arizona State Univ. Rept. No. ERC-R-81014 (May 1981).

"*Alkaline Chromium (VI) Reduction by Ferrous Iron and Sulfide*", Thomas E. Higgins et al., Arizona State University Rept. No. ERC-R-81028 (Oct. 1981).

"*Combined Removal of Cr, Cd and Ni by Alkaline Reduction, Precipitation and Upflow Filtration*", Thomas E. Higgins et al., Arizona State University, Rept. No. CR-R-83015 (Mar. 1983).

"*Treatment of Electroplating Wastewaters by Alkaline Ferrous Reduction of Chromium & Sulfide Precipitation*", Thomas E. Higgins et al., Rept. No. ESL-TR-83-21 (Jun. 1983).

"*Sludge Generation from Ferrous/Sulfide Chromium Treatment*", J. R. Aldrich, Rept. No. ESL-TR-84-27 (Aug. 1984).

"*Ferrous and Sulfide Treatment of Industrial Wastewater at OC-ALC*", CENTEC Applied Technologies (Oct. 15, 1985).

"*Final Report-Ferrous and Sulfide Treatment of Industrial Wastewater at OC-ALC*", CENTEC Corporation (Dec. 16, 1985).

"*Final Report, Research and Development Design and Evaluation Report, Ferrous andd Sulfide Treatment of Hexavalent Chromium*", CENTEC Corporation (Jan. 1986).

"*Sodium Sulfide/Ferrous Sulfate Treatment of Hexavalent Chromium and Other Heavy Metals at Tinker AFB*", P. M. Wikoff et al., Rept. No. ESL-TR-87-39 (Mar. 1988).

"*Pilot Field Verification Studies of the Sodium Sulfide/Ferrous Sulfate Treatment Process*", P. M. Wikoff et al., (unpublished), dated Aug. 1988.

Scott, "Sulflex TM -A New Process Technology for Removal of Heavy Metals from Waste Streams", Proc. 32nd Ind Waste Conf., Purdue Univ. 5/77.

Peters et al., "Removal of Heavy Metals from Industrial Plating Waste Waters by Sulfide Precip., Proc. Ind. Waste Sympos", 5th Water Pollution Fed. Ann. Conf., 1984.

Espenson et al., Kinetics and Mechanisms of Reactions of Chromium (IV) and Iron (II) Species in Acidic Solutions, J. Am. Chem. Soc., 85(21) 3328-3333, 1963.

PROCESS FOR SODIUM SULFIDE/FERROUS SULFATE TREATMENT OF HEXAVALENT CHROMIUM AND OTHER HEAVY METALS

RIGHTS OF THE GOVERNMENT

The invention described herein may be manufactured and used by or for the Government of the U.S. for all governmental purposes without the payment of any royalty.

BACKGROUND OF THE INVENTION

The present invention relates to a method for treating industrial waste waters containing high levels of hexavalent chromium and other heavy metals, and more particularly to a method for efficient reduction of hexavalent chromium to trivalent chromium in a waste treatment process wherein acceptable sludge levels are produced as compared to processes known in the art.

Industrial waste treatment plants downstream from electroplating facilities are generally subjected to industrial wastes which contain relatively high levels of numerous toxic heavy metals in concentrations which often fail to meet National Pollutant Discharge Elimination Permit levels. Therefore, such waste water must be treated to reduce the levels of heavy metals to within discharge permit limits. The metals typically contained in these waste waters include chromium, cadmium, copper, lead, zinc, nickel and aluminum. Presently known processes for the treatment of such waste waters produce large quantities of metal-bearing sludges which are classified as hazardous wastes requiring special and costly handling and transport and disposal in hazardous waste landfills. While numerous processes exist for the precipitation of most heavy metals, hexavalent chromium ($Cr^{+6}$) cannot conveniently be precipitated without first reducing the $Cr^{+6}$ to trivalent chromium ($Cr^{+3}$). The process for reducing $Cr^{+6}$ to $Cr^{+3}$ presently being used by a number of electroplating facilities utilizes sulfur dioxide in the reaction, $$2CrO_4^- + 3SO_2 + 2H_2SO_4 \rightarrow 2Cr^+ + 5SO_4^- + 2H_2O \tag{1}$$

Other methods of acidic reduction of $Cr^{+6}$ include use of sodium sulfite, sodium bisulfite and ferrous compounds. For example, the reaction utilizing sodium sulfite is, $$2CrO_4^{-2} + 3Na_2SO_3 + 5H_2SO_4 \rightarrow 2Cr^{+3} + 8SO_4^{-2} + 5H_2O + 6Na^+ \tag{2}$$

Additional methods of $Cr^{+6}$ reduction include use of ferrous sulfate, sodium sulfide, a combination of both ferrous sulfate and sodium sulfide, and use of sodium borohydride. At acidic pH, the $Cr^{+6}$ usually exists as $HCrO_4^-$, while at alkaline pH, hexavalent chromium exists as $CrO_4^{-2}$. Reduction with ferrous ion, such as with ferrous sulfate, at acidic pH proceeds as, $$3ReSO_4 + HCrO_4^- + 7H^{+3} + Cr^{+3} + 4H_2O + 3\cdot SO_4^{-2} \tag{3}$$

The rate of $Cr^{+6}$ reduction using an amount of ferrous ion substantially in excess of the stoichiometric amount proceeds faster than using a stoichiometric amount. The rate is based upon the reaction of $HCrO_4^-$. Sulfur compounds ($S^{+4}$) can reduce $Cr^{+6}$ at pH less than 3, the rate slowing logarithmically with increased pH. $H_2S$ is the predominant specie at acidic conditions, while at neutral or alkaline pH conditions, the predominant species are $HS^-$ and $CrO_2^{-2}$. When ferrous ion is present as ferrous sulfate, $Cr^{+6}$ is rapidly reduced at neutral and alkaline pH. The ferrous ion appears to catalyze the sulfide reaction. However, ferrous ion is not efficient by itself in reducing $Cr^{+6}$ since only one electron is available per iron atom. A large quantity of iron hydroxide sludge is therefore produced. Ferrous ion and sulfide would appear to be the best combination for reducing and precipitating $Cr^{+6}$ at neutral or near neutral conditions.

Metal precipitation by soluble sulfides require a sulfide source more soluble than the metal to be precipitated. Sodium sulfide dissociates readily into sodium and sulfide ions:

$$Na_2S + H_2O \rightarrow 2Na^+ + S^{-2} + H_2O \tag{4}$$

The free sulfide reacts with a heavy metal to form a precipitate. The metal sulfides that precipitate by this process can form extremely fine colloidal particles (pin floc). Under alkaline operating conditions, evolution of hydrogen sulfide gas is minimal.

It was previously proposed in U.S. Pat. No. 4,705,639 (Nov. 10, 1987) that a ferrous/sulfide process for reduction of $Cr^{+6}$ and precipitation of $Cr^{+3}$ and other heavy metals was possible in heavy metal contaminated waste water at pH of from about 8-10, and using about 90% stoichiometric sulfide and about 10-20% stoichiometric ferrous ion.

The insoluble sulfide (Sulfex ™) process uses freshly precipitated ferrous sulfide to precipitate heavy metals from a metal finishing waste stream. The freshly precipitated ferrous sulfide has substantially more reactive sites than pulverized iron sulfide and results in $Cr^{+6}$ reduction and precipitation in one step (see U.S. Pat. Nos. 3,740,331 and 4,102,784).

It is therefore a principle object of the invention to provide an improved industrial waste treatment process.

It is another object of the invention to provide an improved waste water treatment process for removing heavy metals therefrom.

It is yet another object of the invention to provide a waste water treatment process for reducing contained hexavalent chromium to trivalent chromium and precipitation thereof from the waste water along with other heavy metals.

It is yet another object of the invention to provide a waste water treatment process for removing chromium and other heavy metals from the waste water with the accompanying generation of minimum amounts of sludge.

These and other objects of the invention will become apparent as the detailed description of representative embodiments proceeds.

SUMMARY OF THE INVENTION

In accordance with the foregoing principles and objects of the present invention, a process for treating industrial waste water containing hexavalent chromium ($Cr^{+6}$) and other heavy metals is disclosed which comprises reduction of $Cr^{+6}$ to $Cr^{+3}$ and the precipitation thereof with other heavy metals by addition of sulfide ion and ferrous ion to the waste stream at a pH of about 7 to 9. Polymers are added to the solution to assist flocculation and clarification of the waste stream. More specifically, the invention comprises adding sulfide ion in a sulfide to hexavalent chromium ratio of about 0.7-2.5:1 and adding ferrous ion in a ferrous to hexavalent chromium ratio of about 0.5-5.0:1. The waste stream pH is preferably maintained in the range of about 7.2 to 7.5.

Sludge production by the process of the invention is substantially less than that characteristic of prior art processes. In practicing the invention, the sludge bed may be used as a filter to remove floccules from the waste stream after precipitation of heavy metals. A portion of the sludge may be recirculated through the waste water stream to aid flocculation and clarification. Use of ultrasonic energy enhanced the $Cr^{+6}$ to $Cr^{+3}$ reduction rate.

DETAILED DESCRIPTION OF THE INVENTION

Figure 1:
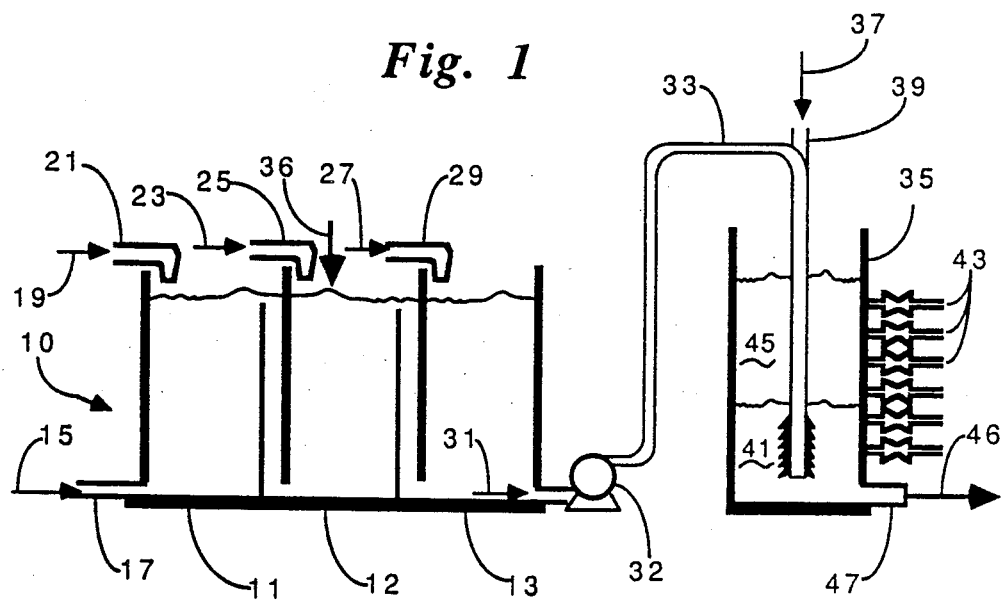
FIG. 1 depicts a bench scale industrial waste treatment plant for illustration of the process of the invention.

While the invention will be described primarily as related to processing waste streams from an electroplating facility, it will be appreciated that the process is useful for any waste stream containing appreciable amounts of heavy metal in order to minimize sludge generation. The reduction of hexavalent chromium ($Cr^{+6}$) to trivalent chromium ($Cr^{+3}$), while important in treating waste water comprising electroplating effluent, is not by itself the primary point of invention herein. The thrust of the invention is the treatment of metal bearing waste water in a novel process wherein significantly lower quantities of sludge are produced than is possible using conventional waste water treating processes.

Environmental Protection Agency (EPA) imposed limits for heavy metal concentrations in effluent from waste treatment plants at the Air Logistics Centers (ALCs) are set forth in TABLE I.

TABLE I

| Constituent | Concentration (mg/L) |
| --- | --- |
| Cadmium, Total | 0.03 |
| Chromium, Total | 1.0 |
| Chromium, Hexavalent | 0.1 |
| Copper, Total | 0.1 |
| Lead, Total | 0.1 |
| Nickel, Total | 1.0 |
| Zinc, Total | 1.0 |

Since 1980, the EPA has classified sludges bearing concentrations of such metals above permit limits as hazardous wastes and have required disposal in hazardous waste landfills, typically at a cost greater than $168 per ton. While certain processes, such as sludge dewatering, have been implemented to reduce the amount of sludge produced, no processes to date have been effective to reduce appreciably the amounts of generated sludge.

The commercially available Sulfex TM process is intended for precipitation of heavy metals, (not $Cr^{+6}$ reduction) and produces a greater quantity of sludge than the conventional acid/$SO_2$/lime process. The process described in U.S. Pat. No. 4,705,639 referred to above is directed to a waste treatment scheme similar to that described herein; that prior process assumes 90-100% efficiency in transfer of electrons from a donor source to a selective recipient in a waste water stream containing many different and competitive ions. Such a process efficiency is not practical, and substantial excesses over stoichiometric quantities of treatment constituents may be required to effectively precipitate most heavy metal.

The invention can be illustrated by the following examples performed in demonstration of the invention and in definition of the process parameters thereof.

EXAMPLE I

Analyses were made of $Cr^{+6}$ reduction and heavy metal removal in distilled water and electroplating wastes. Jar tests were conducted using Phipps and Bird six-paddle stirrer with an illuminated base. Beakers were filled with 800 ml of distilled water and 10 ml of a 2,000 milligrams per liter (mg/L) $Cr^{+6}$ solution. The pH of each solution was adjusted with either caustic or lime. Appropriate volumes of 1,000 mg/L $S^{-2}$ solution ($Na_2S/9H_2O$) was added to each beaker. The solutions were stirred at 100 rpm while the pH of each was adjusted as desired. After six minutes of stirring, the appropriate volume of a 1,000 mg/L ferrous solution (as $FeSO_4/7H_2O$) was added. It may be noted here that in the practice of the invention described herein the ferrous ion may be added in the form either as sulfate or chloride. The volume was brought to 1,000 ml with distilled water and pH adjusted again while the solutions were stirred at 100 rpm. After six minutes, mixing was slowed to 20 rpm for two minutes, during which period final pH adjustments were made. Stirring was stopped and the solutions were allowed to stand for two minutes. If required, the solution was filtered using a funnel with a cotton plug.

$Cr^{+6}$ was determined using the 1,5-diphenyl carbohydrazide method and standard Hach Chemical Company procedures. Ferrous concentration was determined using the Hach procedures for the 1,10-phenanthroline method. Sulfide was determined using the Hach procedure for the methylene blue method for low concentrations and the Orion Specific ion electrode for high concentrations (above 150 mg/L $S^{-2}$). Metal concentrations were determined using a Perkin Elmer 4000 atomic absorption spectrophotometer.

Sludge production was determined using four-liter volumes of the appropriate solution. Sufficient sodium sulfide and ferrous sulfate were added and the pH was adjusted with nitric acid to 7.2–7.5. Flocculant was added and mixing ceased. The floc was allowed to settle before vacuum filtering through a #4 Whatman filter paper. Wet and dry weights were determined by weighing the dry filter paper and the wet filter paper before and after filtering and after drying overnight at 103° C.

Referring now to FIG. 1, shown therein is a schematic of bench scale plexiglass system 10, simulating an existing ALC industrial waste treatment plant, which was used for dynamic tests in demonstration of the invention. Three mixers 11, 12, 13 arranged in sequence, were fed a mixture 15 of metals including $Cr^{+6}$ through inlet 17. Sodium sulfide solution 19 was added through pipe 21 into mixer 11. Ferrous sulfate solution 23 was added through pipe 25 into mixer 12 and cationic polymers 27 were added through pipe 29 into mixer 13. Effluent 31 of mixer 13 was fed using Pump 32 through conduit 33 into clarifier 35. Nitric acid was added to mixer 12 to maintain the pH therein at about 7.2–7.5. Anionic polymers 37 were fed into conduit 33 in front of clarifier 35 as at inlet 39. Effluent 31 from mixer 13 was fed to the center of clarifier 35 where it flowed upwardly through sludge blanket 41. Sample ports 43 were provided for withdrawing samples from either sludge blanket 41 or solution 45 thereabove. The uppermost sample port 43 functioned as a continuous outlet for solution 45. Outlet 47 allowed discharge of sludge 46 from sludge blanket 41.

Figure 2:
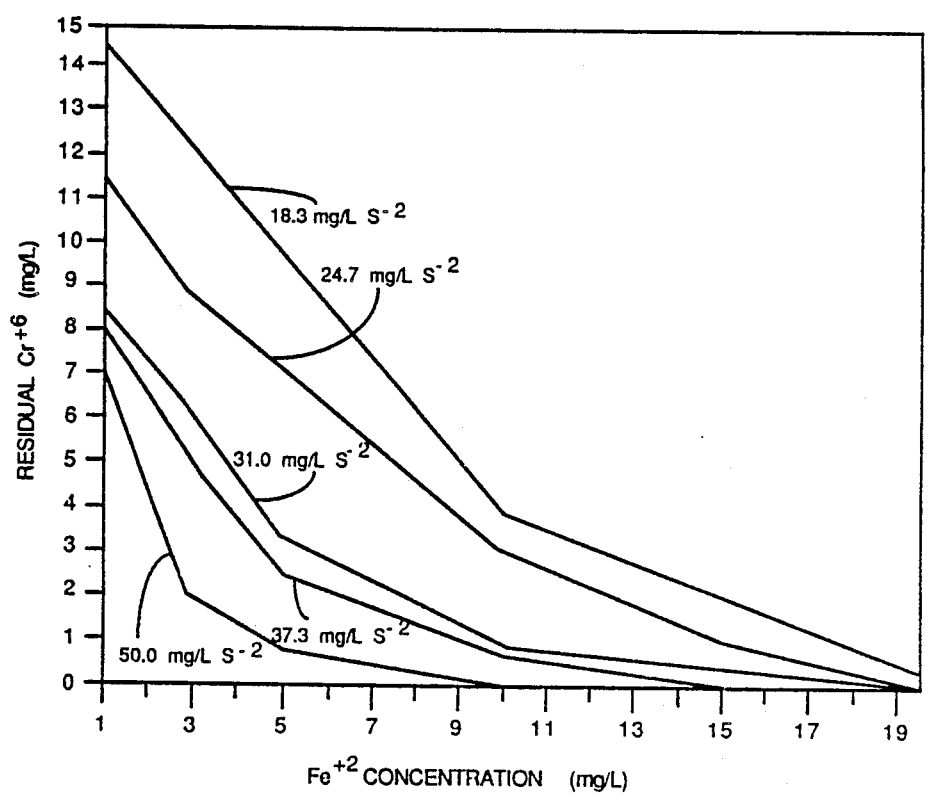
FIG. 2 shows graphs of $Cr^{+6}$ remaining in test solution after partial or total reduction to $Cr^{+3}$ as functions of ferrous concentration at various sulfide concentrations.
Figure 8:
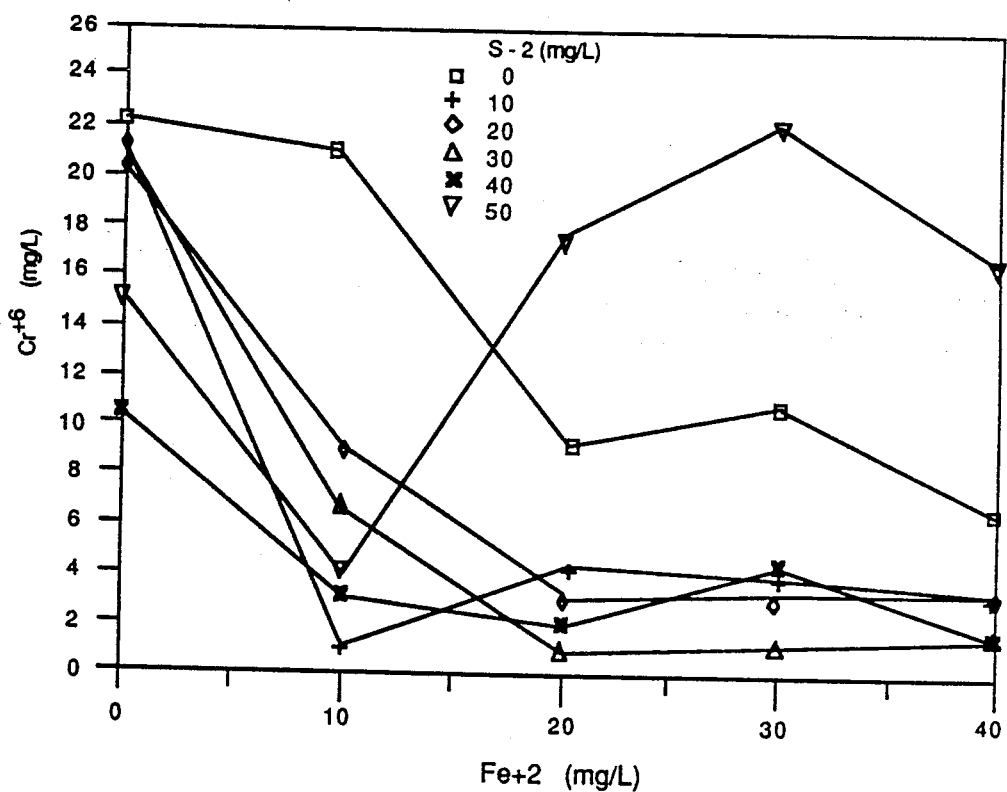
FIG. 8 shows graphs of total chromium remaining in solution as a function of ferrous concentration at various sulfide concentrations.

Referring now to FIG. 2 shown therein are graphs of $Cr^{+6}$ remaining in solution after partial or total reduction to $Cr^{+3}$ as functions of ferrous concentration at the various designated sulfide concentrations. At relatively low ferrous concentrations, little or no reduction of $Cr^{+6}$ occurred, even at high sulfide concentrations. Although high concentrations of sulfide were shown to be more efficient in reducing $Cr^{+6}$ than lower concentrations (see discussion infra re FIG. 5), relatively high sulfide concentrations resulted in fine precipitates and solutions which remained cloudy after filtering through cotton. FIG. 2 illustrates that for residual $Cr^{+6}$ remaining in solution after 15 minutes was dependent upon the level of sulfide used; to attain EPA (TABLE I) levels of $Cr^{+6}$ (0.1 mg/L), doubling the sulfide concentration (from 24.7 to 50.0 mg/L) resulted in an almost halving of the ferrous ion requirement (from about 17 mg/L to about 9 mg/L). Excess sulfide concentrations, however, hindered floccule precipitation (see discussion infra re FIG. 8, TABLE IX). Chromium reduction was found to be optimum when sulfide was added to the $Cr^{+6}$ solution prior to addition of the ferrous ion.

Figure 3:
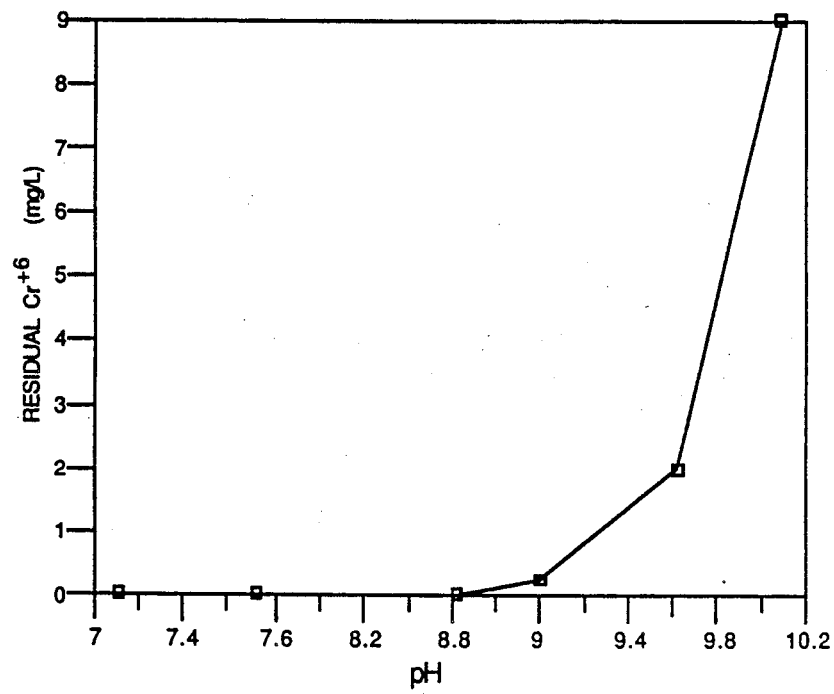
FIG. 3 is a graph of $Cr^{+6}$ remaining in test solution after partial reduction to $Cr^{+3}$ as a function of pH.

Residual $Cr^{+6}$ as a function of pH at optimum sulfide and ferrous concentrations is shown in FIG. 3 and illustrates that $Cr^{+6}$ can be removed to TABLE I limits between pH 7 and 9. At higher pH (above 9) a black precipitate formed.

The jar tests for theoretical sludge production indicate that optimum sulfide and ferrous iron concentrations are 24.7 mg/L and 20.0 mg/L, respectively (for a 20 mg/L $Cr^{+6}$ solution), as shown in TABLE II.

These optimums correspond to a pH within the range 7.2 to 7.5 for optimum polymer flocculant concentrations. Of the polymers tested, high molecular weight powder flocculants produced the best floc and settled without leaving pin floc in suspension.

TABLE II

STOICHIOMETRY AND THEORETICAL SLUDGE PRODUCTION (DISTILLED WATER)[a]

| $S^{-2}$ (mg/L) | Electrons Available (mole)[b] | $Fe^{+2}$ (mg/L) | Electrons Available (mole) | Electrons Excess (mole) | Theoretical Sludge (lb/day)[c] |
|---|---|---|---|---|---|
| 24.7 | 0.0015 | 20.0 | 0.0004 | 0.0007 | 640 |
| 31.0 | 0.0019 | 20.0 | 0.0004 | 0.0011 | 679 |
| 37.3 | 0.0023 | 15.0 | 1.0003 | 0.0014 | 659 |
| 37.3 | 0.0023 | 20.0 | 0.0004 | 0.0015 | 718 |
| 50.0 | 0.0031 | 10.0 | 0.0002 | 0.0021 | 678 |
| 50.0 | 0.0031 | 15.0 | 0.0003 | 0.0022 | 738 |
| 50.0 | 0.0031 | 20.0 | 0.0004 | 0.0023 | 797 |

Figure 4:
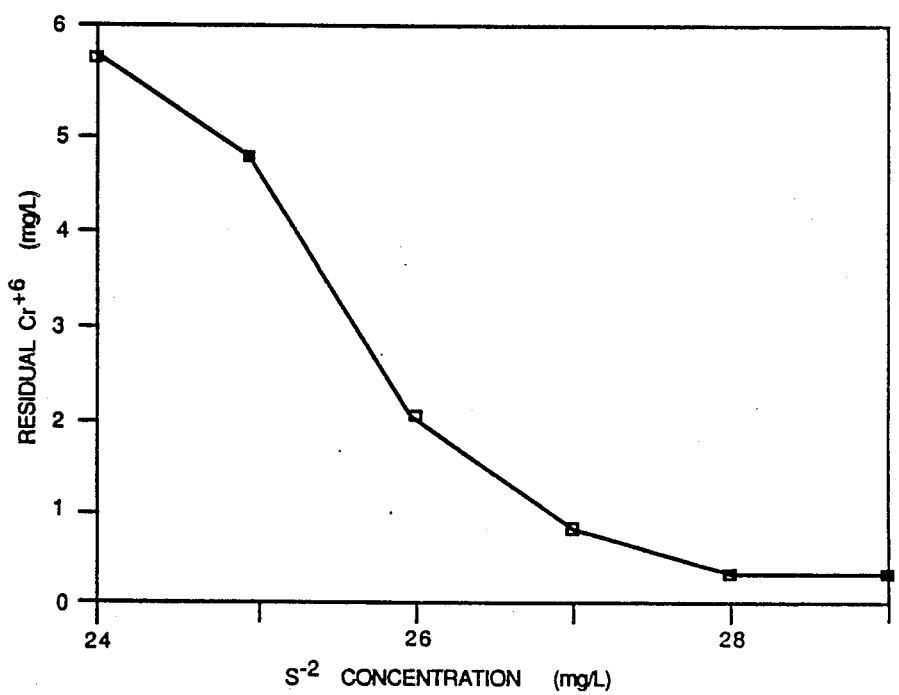
FIG. 4 is a graph of $Cr^{+6}$ remaining in test solution after partial reduction to $Cr^{+3}$ as a function of sulfide concentration in the presence of added heavy metals.

[a] 20 mg/L $Cr^{+6}$ (0.0012 moles $e^-$ required)
[b] 2 electrons per mole of sulfide
[c] 750,000 gal/day The effect of additional metal ions on chromium reduction and reagent requirements were determined. The metals of TABLE III, when added to the $Cr^{+6}$ solution, increased the sulfide requirement for $Cr^{+6}$ reduction below TABLE I limits from 24.7 mg/L to 28.0 mg/L, as shown in FIG. 4.

TABLE III

| Metal Added | Concentration (mg/L) |
|---|---|
| Ni | 2.0 |
| Cd | 0.1 |
| Cu | 0.2 |
| Pb | 0.4 |
| Zn | 0.4 |
| Al | 1.5 |
| $Cr^{+6}$ | 20.0 |

When treating a distilled water solution containing 20 mg/L $Cr^{+6}$ in system 10 of FIG. 1, $Cr^{+6}$ was reduced to less than 0.06 mg/L using optimal concentrations of 24.7 mg/L sulfide and 20.0 mg/L ferrous ion. System 10 was operated at 40 ml/min. 60 ml/min and 100 ml/min which correspond to flows of 500,000, 800,000 and 1,250,000 gallons per day through the clarifier of the subject ALC plant. Samples taken from clarifier 35 reported in TABLE IV indicate that total chromium carried through clarifier 35 and into the plant effluent was well below TABLE I requirement of 1.0 mg/L.

TABLE IV

TOTAL CHROMIUM CARRYOVER AS A FUNCTION OF FLOW RATE

| Flowrate (ml/min) | Port 4 Cr mg/L | Port 6 Cr mg/L | Port 8 Cr mg/L |
|---|---|---|---|
| 40 | 0.06 | 0.06 | 0.06 |
| 64 | 0.15 | 0.16 | 0.15 |
| 100 | 0.36 | 0.28 | 0.20 |

EXAMPLE II

Jar tests on electroplating waste were conducted similarly to those of EXAMPLE I. Day-to-day concentration variations in the waste was ameliorated somewhat by collecting 40 gallons of electroplating waste from the subject ALC plant. $Cr^{+6}$ concentration in the waste was extremely high (about 350 mg/L). Sufficient waste was diluted with distilled water to form a 100 liter solution of 55 mg/L $Cr^{+6}$ for use in the tests in order to simulate average electroplating waste. One liter of the diluted waste solution was placed in a beaker and the pH adjusted to 7.2-7.5 with caustic (initial pH was 4.0). The solutions were stirred at rpm while the desired volume of a 2,000 mg/L sulfide solution was added. Stirring continued for six minutes, at which time the appropriate volume of a 2,000 mg/L ferrous solution was added. The pH was adjusted and stirring continued for six minutes at 100 rpm. Stirring was slowed to 20 rpm for two minutes to allow floc formation; stirring was then stopped and the solutions were left undisturbed for two minutes. If necessary, resulting solutions were filtered through cotton.

Figure 5:
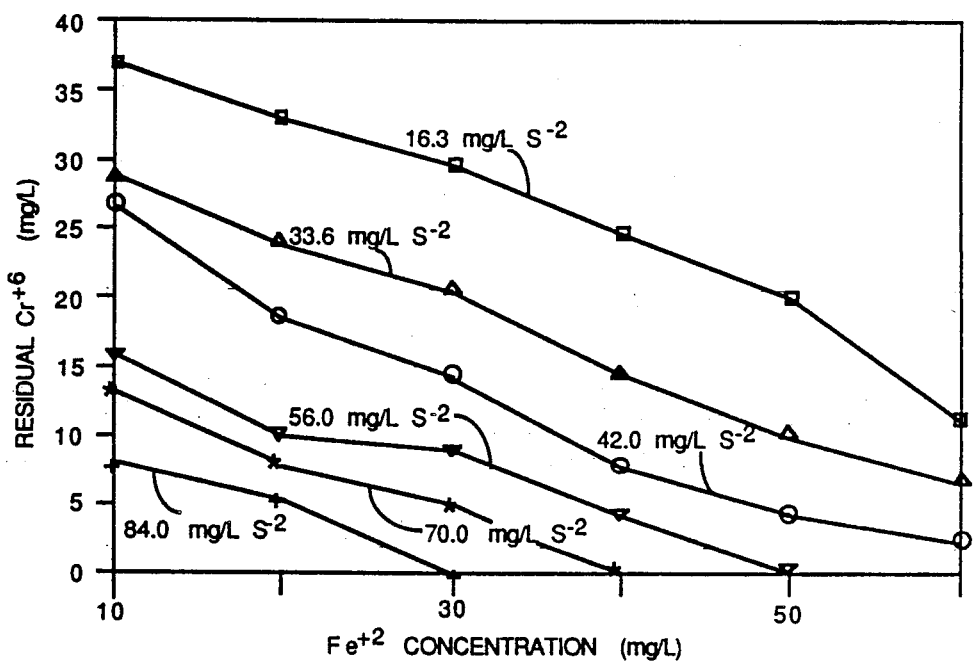
FIG. 5 shows graphs of $Cr^{+6}$ remaining in electroplating waste solution after partial or total reduction to $Cr^{+3}$ as a function of ferrous concentration at various sulfide concentrations.

Sulfide and ferrous ion requirements for reduction and precipitation of the electroplating wastes are shown in FIG. 5. Optimum reagent requirements for 55 mg/L $Cr^{+6}$ are shown as 56 mg/L sulfide and 50.0 mg/L ferrous ion as determined by the theoretical sludge production shown in TABLE V. As suggested above relative to the EXAMPLE I tests, ferrous and sulfide ions in higher-than-optimal concentrations, although effective to a degree in reducing $Cr^{+6}$, result in black water (a fine suspension of FeS that does not filter out or precipitate with the floccules) and corresponding high concentrations of soluble metals in the solutions.

Figure 6:
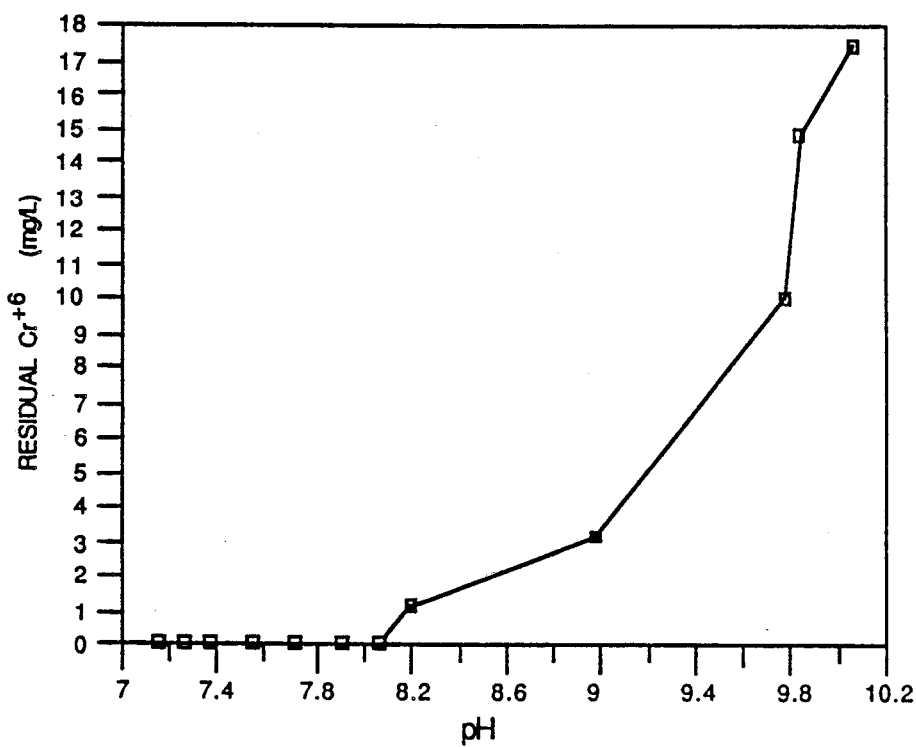
FIG. 6 is a graph of $Cr^{+6}$ remaining in electroplating waste solution after partial or total reduction to $Cr^{+3}$ as a function of pH.

The effect of pH on $Cr^{+6}$ reduction in the electroplating waste was determined using the optimum reagent concentration. FIG 6 shows $Cr^{+6}$ remaining in solution to be below TABLE I limits between pH 7.2 and 8.2 but to increase dramatically above pH 9.0.

TABLE V

STOICHIOMETRY AND THEORETICAL SLUDGE PRODUCTION (ELECTROPLATING WASTE)[a]

| $S^{-2}$ (mg/L) | Electrons Available (mole)[b] | $Fe^{+2}$ (mg/L) | Electrons Available (mole) | Excess (mole) | Theoretical Sludge (lb/day)[c] |
|---|---|---|---|---|---|
| 56.0 | 0.0035 | 50.0 | 0.0009 | 0.0012 | 1626 |
| 56.0 | 0.0035 | 60.0 | 0.0011 | 0.0014 | 1746 |
| 70.0 | 0.0044 | 40.0 | 0.0007 | 0.0019 | 1594 |
| 70.0 | 0.0044 | 50.0 | 0.0009 | 0.0021 | 1713 |
| 70.0 | 0.0044 | 60.0 | 0.0011 | 0.0023 | 1833 |
| 84.0 | 0.0053 | 30.0 | 0.0005 | 0.0026 | 1562 |
| 84.0 | 0.0053 | 40.0 | 0.0007 | 0.0028 | 1681 |
| 84.0 | 0.0053 | 50.0 | 0.0009 | 0.0030 | 1801 |
| 84.0 | 0.0053 | 60.0 | 0.0011 | 0.0032 | 1920 |

[a]55 mg/L $Cr^{+6}$ (0.0032 moles $e^-$ required)
[b]2 electrons per mole of sulfide
[c]750,000 gal/day

EXAMPLE III

Waste water typically comprising influent to the subject ALC waste treatment plant was collected for jar testing. Analysis of the influent is shown in TABLE VI. The pH was lowered from 9.5 to 7.3 with nitric acid and beakers were filled with one liter of the resulting solution. Each solution was stirred at 100 rpm as the desired volume of 1,000 mg/L sulfide solution was added and stirring was continued for six minutes. The appropriate volume of 1,000 mg/L ferrous solution was added, pH adjusted, and stirring continued for six minutes at 100 rpm. Stirring was slowed to 20 rpm for two minutes to allow floc formation, pH adjustments were made, and stirring was stopped. The solutions sat undisturbed for two minutes, and if necessary were filtered through cotton.

TABLE VI

| Metal Constituent | Concentration (mg/L) |
|---|---|
| $Cr^{+6}$ | 9.00 |
| Cr | 9.10 |
| Fe | 1.42 |
| Cd | 0.10 |
| Cu | 0.02 |
| Ni | 0.97 |
| Pb | 0.15 |
| Zn | 0.13 |

Figure 7:
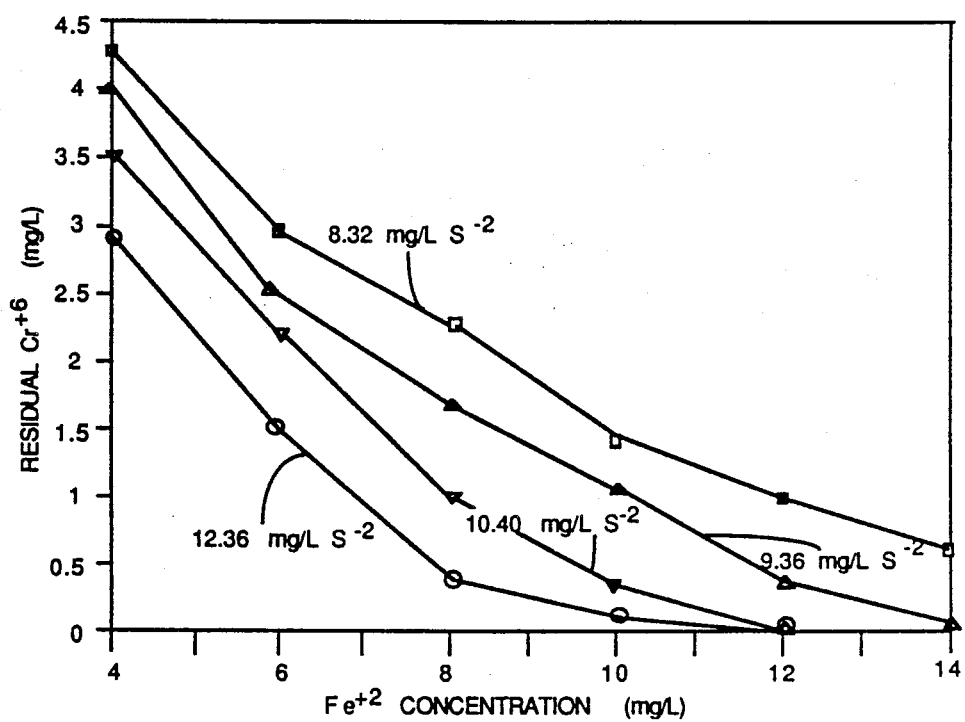
FIG. 7 shows graphs of $Cr^{+6}$ remaining in a waste treatment plant influent stream after partial or total reduction to $Cr^{+3}$ as a function of ferrous concentration at various sulfide concentrations.

The corresponding theoretical sludge production shown in TABLE VII and the graphs of $Cr^{+6}$ remaining in the influent stream after partial or total reduction to $Cr^{+3}$ as functions of ferrous concentration at various sulfide concentrations of in FIG. 7 indicate that optimum requirements were 12,36 mg/L sulfide and 10.0 mg/L ferrous ion.

A summary of optimum conditions for reduction of $Cr^{+6}$ to less than 0.1 mg/L for the three experimental waste streams described in EXAMPLES I, II, III is presented in TABLE VIII.

Data on the jar tests conducted in demonstration of the invention are summarized in TABLE IX. Data of TABLE IX show that the chemistry of $Cr^{+6}$ reduction to $Cr^{+3}$ according to the process of the invention is concentration dependent for several species, particularly $Fe^{+2}$ and $HS^-$. For example, FIG. 7 shows that high sulfide concentration are efficient in reducing $Cr^{+6}$, but that too high a concentration hinders floccule precipitation, as suggested in FIG. 8.

TABLE VII

STOICHIOMETRY AND THEORETICAL SLUDGE PRODUCTION (WASTEWATER)[a]

| $S^{-2}$ (mg/L) | Electrons Available (mole)[b] | $Fe^{+2}$ (mg/L) | Electrons Available (mole) | Electrons Excess (mole) | Theoretical Sludge (lb/day)[c] |
|---|---|---|---|---|---|
| 10.40 | 0.00065 | 12.0 | 0.00021 | 0.00034 | 461 |
| 10.40 | 0.00065 | 14.0 | 0.00025 | 0.00038 | 515 |
| 12.36 | 0.00077 | 10.0 | 0.00018 | 0.00043 | 582 |
| 12.36 | 0.00077 | 12.0 | 0.00021 | 0.00046 | 623 |
| 12.36 | 0.00077 | 14.0 | 0.00025 | 0.00050 | 678 |

[a]9 mg/L $Cr^{+6}$ (0.00052 moles $e^-$ required)
[b]2 electrons per mole of sulfide
[c]750,000 gal/day

TABLE VIII

SUMMARY OF OPTIMUM CONDITIONS FOR GIVEN $Cr^{+6}$ CONCENTRATIONS

| Parameter | EXAMPLE I (20 mg/L) | EXAMPLE II (55 mg/L) | EXAMPLE III (9 mg/L) |
|---|---|---|---|
| $S^{-2}$ (mg/L) | 24.7 | 56.0 | 12.4 |
| $Fe^{+2}$ (mg/L) | 20.0 | 55.0 | 10.0 |
| pH | 7.2-9.0 | 7.2-8.1 | 7.2-7.5 |
| Polymer | Betz 1120$^R$ (1.0 mg/L) | Betz 1120$^R$ (1.0 mg/L) | Betz 1195$^R$ (15 mg/L) Betz 1120$^R$ (0.5 mg/L) |

EXAMPLE IV

A pilot scale field verification test unit was constructed at the subject ALC industrial waste treatment plant, designed to replicate flow characteristics and retention times of the on-site waste treatment facility in demonstration of the process of the

TABLE IX

REACTION CONDITIONS AND RESULTS OF JAR TESTS WITH HEXAVALENT CHROMIUM, SODIUM SULFIDE AND FERROUS SULFATE

| Run Number | Initial Conditions (a,b,c) $S^{-2}$ | $Fe^{+2}$ | $Cr^{+6}$ (e) | Cr (f) | $Fe^{+2}$ (g) | Final Conditions (d) Fe (f) | $S^{-2}$ (h) | Floc wt (i) |
|---|---|---|---|---|---|---|---|---|
| 1 | 0 | 0 | 21 | 22 | 0.0 | 0.0 | 0 | None |
| 2 | 0 | 10 | 18 | 21 | 4.4 | 7.8 | 0 | 100 |
| 3 | 0 | 20 | 13 | 9 | 0.1 | 6.0 | 0 | 660 |
| 4 | 0 | 30 | 11 | 11 | 0.2 | 6.3 | 0 | — |
| 5 | 0 | 40 | 8 | 7 | 0.0 | 2.3 | 0 | 250 |
| 6 | 10 | 0 | 19 | 22 | 0.0 | 0.0 | 10 | None |
| 7 | 10 | 10 | 8 | 1 | 0.0 | 2.0 | 1 | 470 |
| 8 | 10 | 20 | 2 | 4 | 0.2 | 0.8 | 1 | 750 |
| 9 | 10 | 30 | 0 | 3 | 0.2 | 1.0 | 1 | 970 |
| 10 | 10 | 40 | 0 | 3 | 0.0 | 0.8 | 1 | 1170 |
| 11 | 20 | 0 | 17 | 20 | 0.0 | 0.8 | 19 | None |
| 12 | 20 | 10 | 6 | 8 | 0.1 | 1.0 | 7 | 530 |
| 13 | 20 | 20 | 0 | 3 | 0.0 | 1.0 | 1 | 830 |
| 14 | 20 | 30 | 0 | 3 | 0.0 | 1.0 | 1 | 830 |
| 15 | 20 | 40 | 0 | 3 | 0.0 | 0.8 | 1 | 1280 |
| 16 | 30 | 0 | 15 | 22 | 0.0 | 0.0 | 16 | None |
| 17 | 30 | 10 | 3 | 7 | 0.0 | 2.3 | 8 | 620 |
| 18 | 30 | 20 | 0 | 1 | 0.0 | 0.8 | 5 | 820 |
| 19 | 30 | 30 | 0 | 1 | 0.3 | 2.7 | 2 | 1140 |
| 20 | 30 | 40 | 0 | 1 | 1.2 | 2.9 | 2 | 1250 |
| 21 | 40 | 0 | 12 | 11 | 0.0 | 0.0 | 22 | 240 |
| 22 | 40 | 10 | 0 | 3 | 0.5 | 1.2 | 15 | 640 |
| 23 | 40 | 20 | 0 | 2 | 0.2 | 2.8 | 11 | 870 |
| 24 | 40 | 30 | 0 | 1 | 0.9 | 4.4 | 5 | 1000 |
| 25 | 40 | 40 | 0 | 1 | 0.1 | 0.8 | 2 | 1400 |
| 26 | 50 | 0 | 13 | 15 | 0.0 | 0.0 | 41 | 200 |
| 27 | 50 | 10 | 0 | 4 | 0.0 | 2.0 | 22 | 620 |
| 28 | 50 | 20 | 0 | 17 | 2.2 | 16.8 | 16 | 560 |
| 29 | 50 | 30 | 0 | 22 | 2.1 | 27.8 | 3 | 560 |
| 30 | 50 | 40 | 0 | 16 | 3.0 | 35.4 | 2 | 990 |

Figure 9:
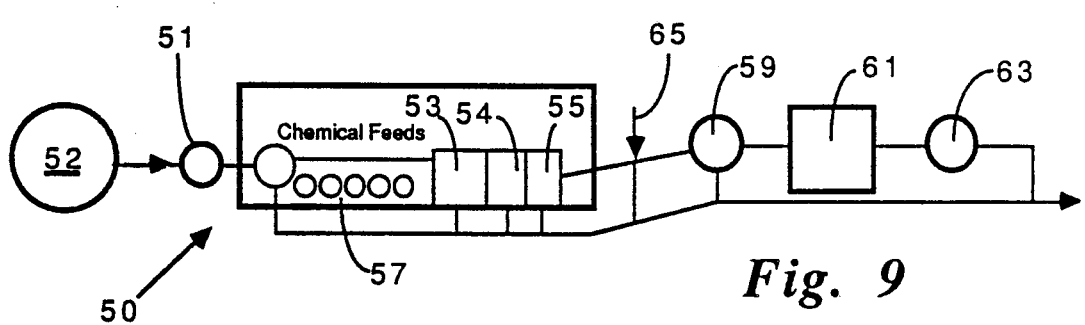
FIG. 9 depicts a pilot scale waste treatment plant used in demonstration of the invention.

(a) Concentrations are in ppm.
(b) Initial $Cr^{+6}$ concentration was 20.0 ppm.
(c) PH adjusted with $H_2SO_4$ or NaOH to 7.2–7.5 after $Fe^+$ added.
(d) After the initial reagents had been mixed for 5 minutes.
(e) As determined by Hach method for $Cr^{+6}$ total chromium or iron.
(f) As determined by AAS.
(g) As determined by Hach method for $Fe^{+2}$.
(h) As determined by Hach method for $S^{-2}$.
(i) Dry weight of floc.

invention. The pilot plant 50 is shown in FIG. 9 and comprises an equalization tank 51, mixer tanks 53, 54, 55, chemical feed tanks 57, a 330-gallon solids contact clarifier 59, activated sludge bed 61 and final clarifier 63. In order to minimize effects on the operation of pilot plant 50 of day-to-day perturbations in the effluent from the electroplating facility (not shown in FIG. 9), waste therefrom was held in reservoir 52 and periodically pumped to equalization tank 51. Sulfuric acid and caustic were used to control pH of waste influent in tank 51. Mixer tanks 53, 54, 55 were operated similarly to that suggested for the FIG. 1 system, wherein effluent from mixer 11 flowed over the top of a weir to mixer 12 and similarly to mixer 13 to prevent back mixing. Sodium sulfide was added to mixer tank 53, ferrous sulfate and sulfuric acid were added to mixer tank 54 and a cationic polymer was added to mixer tank 55. Anionic polymer was added between mixer tank 55 and clarifier 59 as at 65. Clarifier 59 had a retention time of 2.75 hours at a flow rate of 2 gallons per minute.

Figure 10:
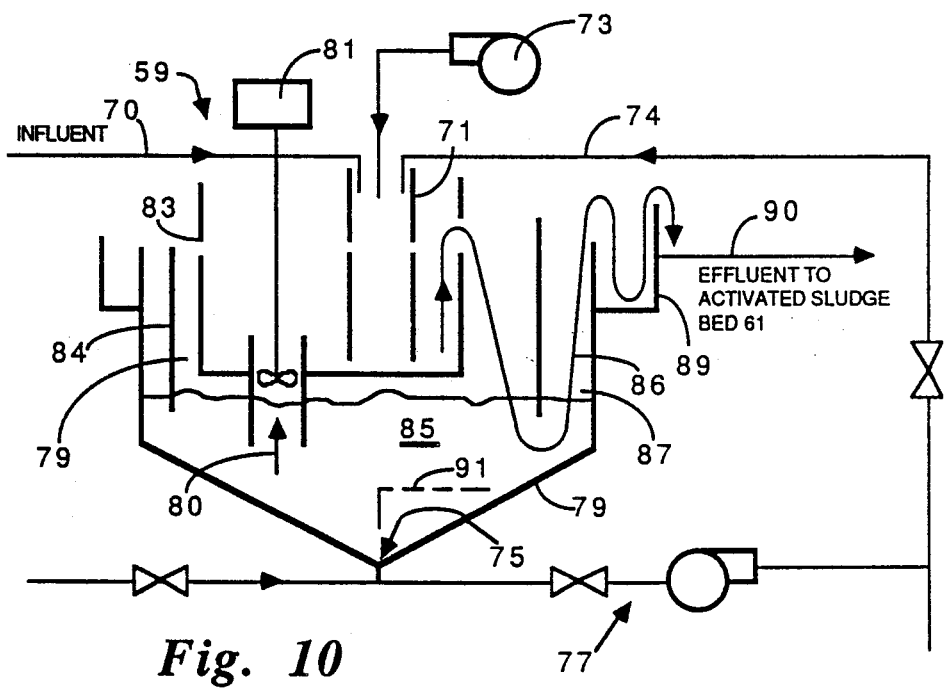
FIG. 10 depicts a solids contact clarifier of FIG. 8 used in demonstration of the invention.

Referring now to FIG. 10, shown is a solids contact clarifier 59 typical of that usable in the system of FIG. 9 in demonstration of the invention. Influent 70 from mixer 55 (FIG. 9) fed into center well 71 of clarifier 59, is integrated with anionic polymer 73 (e.g. Betz 1120) and external sludge flow 74 which is circulated from sludge bed 85 through opening 75 in the bottom of clarifier 59 and through valved conduit and pump means 77. Waste stream 70, polymer 73 and external sludge flow 74 are mixed in mixing chamber 79. An internal sludge flow 80 is moved into mixing chamber 79 and mixed using mixer 81. Liquid 82 with entrained floc and metal spills through openings 83 into mixing chamber 79 internally of intermediate skirt 84 and onto sludge bed 85. Fluids within skirt 84 percolate through the sludge bed, which percolation filters out floc, and flows as substantially clear effluent 86 from under the wall defining skirt 84 and into collecting chamber 87. Effluent 86 is collected in weir 89 and withdrawn through conduit 90 to activated sludge bed 61 (FIG. 9). Rake 91 moving at slow speed (typically 3 rpm) around the bottom of clarifier 59 moves sludge to the sludge outlets and prevents channeling of sludge bed 85 by effluent 86. Ferrous solutions were made using ferrous sulfate heptahydrate while sulfide solutions were prepared from stock sodium sulfide. Concentrated sulfuric acid was added to each batch to decrease the amount of ferrous oxidized to ferric ion.

Figure 11:
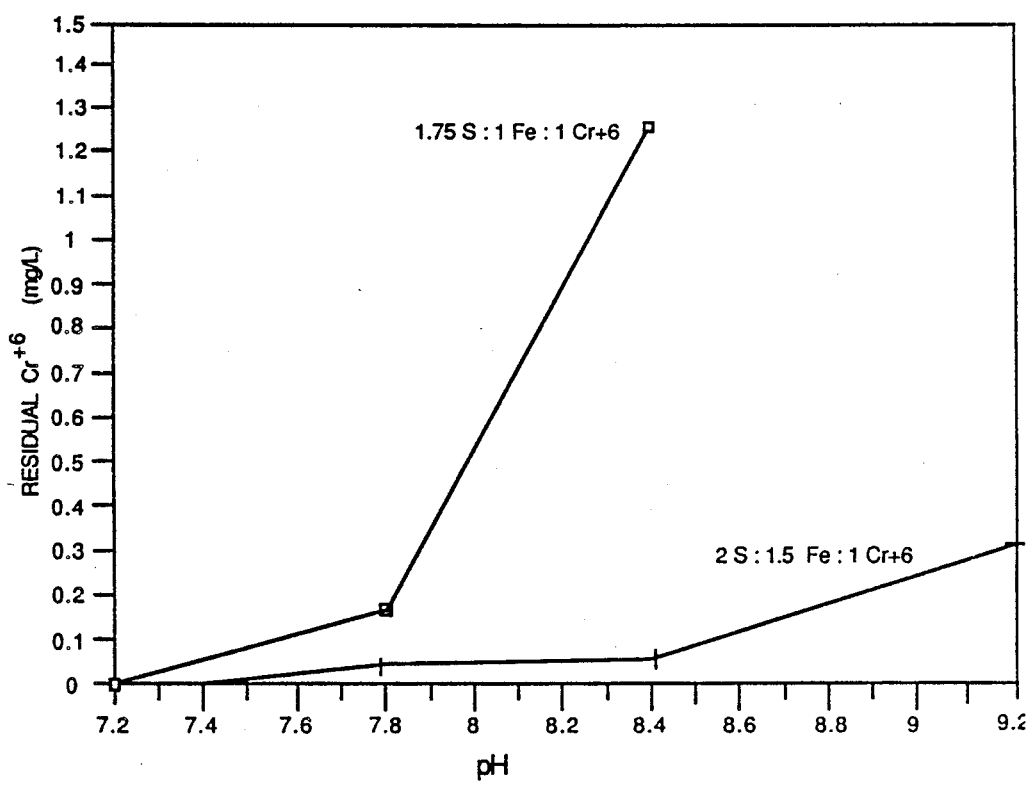
FIG. 11 shows graphs of $Cr^{+6}$ remaining in solution as a function of pH at two different S:Fe:$Cr^{+6}$ ratios.

The effect of pH on $Cr^{+6}$ reduction was studied by holding pH of the influent to mixer tank 54 (FIG. 9) at 8.0 while varying pH within tank 54. FIG. 11 shows the effect of pH using a feed ratio into mixer tank 54 of 1.75 mg/L sulfide to 1 mg/L ferrous to 1 mg/L $Cr^{+6}$ and a ratio of 2.0 mg/L sulfide to 1.5 mg/L ferrous to 1 mg/L $Cr^{+6}$. At the higher sulfide and ferrous ratios, $Cr^{+6}$ was reduced to less than TABLE I levels between pH of 7.2–8.4; in accordance with a governing principle of the invention, however, $Cr^{+6}$ was substantially completely reduced only at pH 7.2–7.5. For the lower sulfide to ferrous ratio. TABLE I levels were achieved only at pH 7.2–7.6 and $Cr^{+6}$ was substantially completely reduced only at pH 7.2.

Typical electroplating waste stream metals fed to clarifier 59 were removed by precipitation as shown in TABLE X.

TABLE X

| Metal | Influent (mg/L) | Effluent (mg/L) |
|---|---|---|
| $Cr^{+6}$ | 0.50 | 0.00* |
| Cr (Total) | 3.37 | 0.15 |
| Ni | 3.71 | 0.38 |
| Cd | 0.96 | 0.02 |
| Cu | 0.77 | 0.00* |
| Fe | 1.31 | 1.93 |
| Zn | 0.59 | 0.05 |

*Below detection limits

Because floc formed in the sodium sulfide/ferrous sulfate process is extremely fine, effluent 86 quality, as judged by clarity, is difficult to achieve, even at optimized parameters, without filtration. Therefore, the process of the invention appears optimized with sufficient sludge depth within bed 85 at least a few inches above the bottom of skirt 84 as suggested in FIG. 10, which requires effluent 86 to flow through sludge bed 85 so as to filter out pin floc produced by the process.

The effect of suspended solids in mixing chamber 79 (FIG. 10) on turbidity of effluent 86 was determined. In order to increase concentration of suspended solids, external sludge recirculation 74 was initiated. With insufficient sludge recirculation 74, proper sludge depth within sludge bed 85 was difficult to maintain. As external sludge recirculation 74 rate increased to about 10–20% of influent 70 flow (1,320–2,640 ml/min) turbidity decreased markedly and heavy metal precipitation increased. It was also determined that relatively high (95° F.) and low (41° F.) temperatures had no significant effect on metal precipitation in clarifier 59 within TABLE I levels. In the use of $Na_3PO_4$, no appreciable effect on $Cr^{+6}$ reduction was noticed with concentrations as high as 176 mg/L $PO_4^{-3}$. Adding EDTA (a typical chelating agent in electroplating baths) up to 50 mg/L caused no change in effluent quality from clarifier 59. Cyanide, typically used in metal stripping prior to electroplating, may contaminate the waste water. The sodium sulfide/ferrous sulfate process will not eliminate cyanide, but it may complex with metals in the waste water and not be presented at full strength to the activated sludge when introduced into influent 70. Levels as high as 10 mg/L cyanide were reduced to 1.85 mg/L in clarifier 59 and to 0.5 mg/L in activated sludge bed 61, where it apparently had little or no effect.

Figure 12:
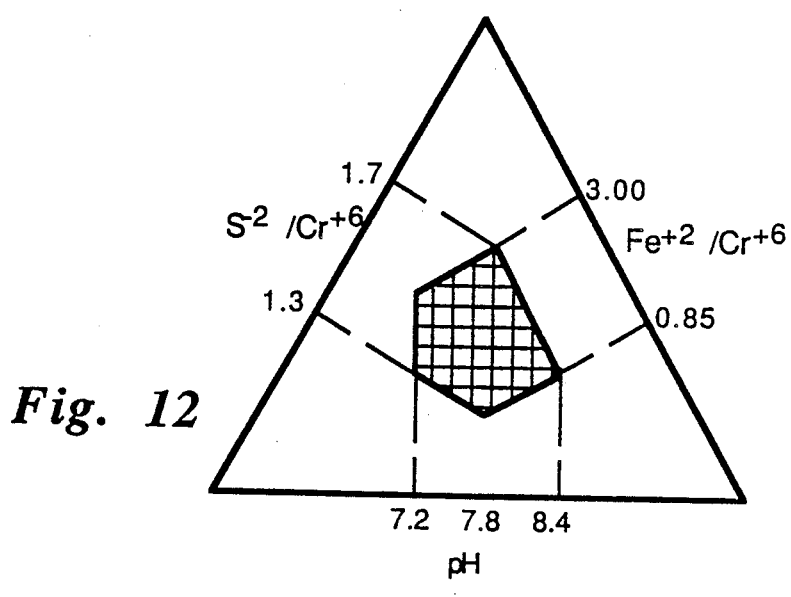
FIG. 12 is a graph of optimum process operational ranges of the invention.

FIG. 12 illustrates preferred operational ranges for the process of the invention. The ratios of $S^{-2}$ and $Fe^{+2}$ to $Cr^{+6}$ are expressed in mg/L per mg/L $Cr^{+6}$. The optimum process operational ranges are from about 1.3–1.7 mg/L $S^{-2}$ per mg/L $Cr^{+6}$ and from about 0.85–3.00 mg/L $Fe^{+2}$ per mg/L $Cr^{+6}$ at pH of 7.2–8.4. While the process of the invention will operate outside the preferred ranges, FIG. 12 defines operating conditions wherein operation of the process is unexpectedly efficient in accordance with an underlying principle of the invention.

Figure 13:
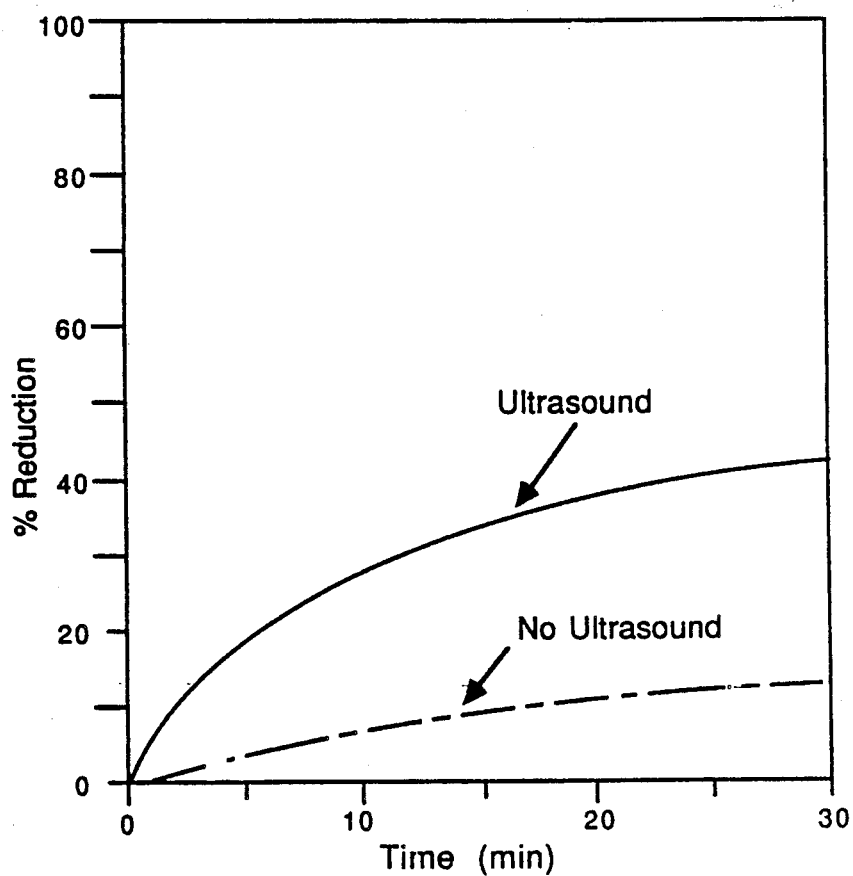
FIG. 13 is a graph of $Cr^{+6}$ reduction versus time with and without application of ultrasonic energy.

In a test to observe the effect of ultrasonic energy on the reduction of $Cr^{+6}$ in the presence of sodium sulfide, a marked increase in the rate of reduction of $Cr^{+6}$ to $Cr^{+3}$. As shown in FIG. 13, the reduction $Cr^{+6}$ to $Cr^{+3}$ proceeded about seven times faster with about 20 KHz of ultrasonic energy at about 25 watts/cm$^2$ imparted to a 235 ml vessel containing an aqueous solution of 20 mg/L $Cr^{+6}$ and 40 mg/L sulfide.

The invention therefore provides an improved method for treating industrial waste waters containing high levels of hexavalent chromium and other heavy metals by reduction of hexavalent chromium to trivalent chromium in the waste treatment process and wherein acceptably small amounts of sludge are produced. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or the scope of the appended claims.

We claim:

1. A process of reducing hexavalent chromium to trivalent chromium and precipitating the trivalent chromium from a waste water stream to form a sludge for disposal, said process comprising the steps of:
   (a) adding soluble sulfide ion to said stream in a ratio of sulfide ion to hexavalent chromium of from about 0.7 to 2.5;
   (b) adding soluble ferrous ion to said stream in a ratio of ferrous ion to hexavalent chromium of from about 0.5 to 5.0;
   (c) thereafter adjusting pH of said stream to about 7.2 to 7.5;
   (d) adding a flocculating polymer to said stream to promote formation of a floc comprising precipitated trivalent chromium;
   (e) forming a sludge bed comprising said precipitated trivalent chromium; and
   (f) thereafter filtering the floc from said stream using said sludge bed containing said precipitated trivalent chromium.

2. The process of claim 1 wherein said ferrous ion is added from a material selected from the group consisting of ferrous sulfate and ferrous chloride.

3. The process of claim 1, further comprising the step of recirculating sludge from said sludge bed into said stream at a rate of about 10 to 20 percent by volume of the flow rate of said stream to promote clarification of said stream.

4. The process of claim 1 further comprising the step of introducing ultrasonic energy into said stream in the presence of said sulfide ion and said ferrous ion to enhance the rate of reduction of hexavalent chromium to trivalent chromium.

5. A process of reducing hexavalent chromium to trivalent chromium and precipitating the trivalent chromium and other heavy metals from a waste water stream to form a sludge for disposal, said process comprising the steps of:
   (a) adding soluble sulfide to said stream in a ratio of sulfide to hexavalent chromium of from about 0.7 to 2.5;
   (b) thereafter adding soluble ferrous ion to said stream in a ratio of ferrous ion to hexavalent chromium of about 0.5 to 5.0;
   (c) thereafter adjusting pH of said stream to about 7.2 to 7.5;
   (d) adding a flocculating polymer to said stream to promote formation of a floc comprising precipitated trivalent chromium and other heavy metals and to aid in removal of said floc from said stream by forming a sludge bed containing said precipitated trivalent chromium and other heavy metals therein;
   (e) filtering the floc from said stream using said sludge bed;
   (f) recirculating sludge into said stream to aid in removal of said floc therefrom; and
   (g) introducing ultrasonic energy into said stream in the presence of said sulfide ion and said ferrous ion to enhance the rate of reduction of hexavalent chromium to trivalent chromium.

6. The process of claim 5 wherein said ferrous ion is added from a material selected from the group consisting of ferrous sulfate and ferrous chloride.

7. A process of operating a solids contact clarifier having a mixer chamber disposed within a sludge bed, said process being effective to reduce hexavalent chromium to trivalent chromium and to precipitate the trivalent chromium and other heavy metals from a waste water stream into the sludge bed, said process comprising the steps of:
   (a) adding soluble sulfide to said stream to provide a ratio of sulfide ion to hexavalent chromium of about 0.7:1 to 2.5:1;
   (b) thereafter adding soluble ferrous ion to said stream to provide a ration of ferrous ion to hexavalent chromium of about 0.5:1 to 5.0:1;
   (c) adjusting pH of said stream to about 7.2 to 7.5;
   (d) adding a flocculating polymer to said stream to promote formation of a floc comprising precipitated trivalent chromium and other heavy metals and clarification of said stream;
   (e) forming a sludge bed comprising said precipitated trivalent chromium and other heavy metals separated from the stream; and (f) recirculating sludge into said stream at a rate of about 10 to 20 per cent by volume of the flow rate of said stream to aid in removal of said floc therefrom.

8. The process of claim 7 wherein said ferrous ion is added from a material selected from the group consisting of ferrous sulfate and ferrous chloride.

9. The process of claim 7, further comprising the step of introducing ultrasonic energy into said stream in the presence of said sulfide ion and said ferrous ion to enhance the rate of reduction of hexavalent chromium to trivalent chromium.

* * * * *

UNITED STATES PATENT AND TRADEMARK OFFICE
CERTIFICATE OF CORRECTION

PATENT NO. : 5,000,859
DATED : March 19, 1991
INVENTOR(S) : Dan F. Suciu et al It is certified that error appears in the above-identified patent and that said Letters Patent is hereby corrected as shown below:

Col 1, line 8, "U.S" should be ---United States---

$$---2Cr_4^{-2} + 3SO_2 + 2H_2SO_4 \rightarrow 2Cr^{+3} + 5SO_4^{-2} + 2H_2O---$$

Col 1, line 60, equation (3) should read as follows:

$$---3FeSO_4 + HCrO_4^- + 7H^+ \rightarrow 3Fe^{+3} + Cr^{+3} + 4H_2O + 3SO_4^{-2}---$$

Col 4, line 63, the period (.) second occurrence should be a comma (,).
Col 5, line 30, "Pump" should be ---pump---.
Col 6, line 47, the period (.) after "min" should be a comma (,).
Col 7, line 9, after "at" should appear ---100---.
Col 10, line 31, the period (.) should not appear.
Col 12, line 7, in claim 3, first line, the comma (,) should not appear.
Col 14, line 3, in claim 9, first line, the comma (,) should not appear.

Signed and Sealed this

First Day of December, 1992

*Attest:*

DOUGLAS B. COMER

*Attesting Officer*    *Acting Commissioner of Patents and Trademarks*